April 19, 1938. K. W. MESTERTON 2,114,428
VEGETABLE CUTTER AND SLICER
Filed Sept. 17, 1936 2 Sheets-Sheet 1
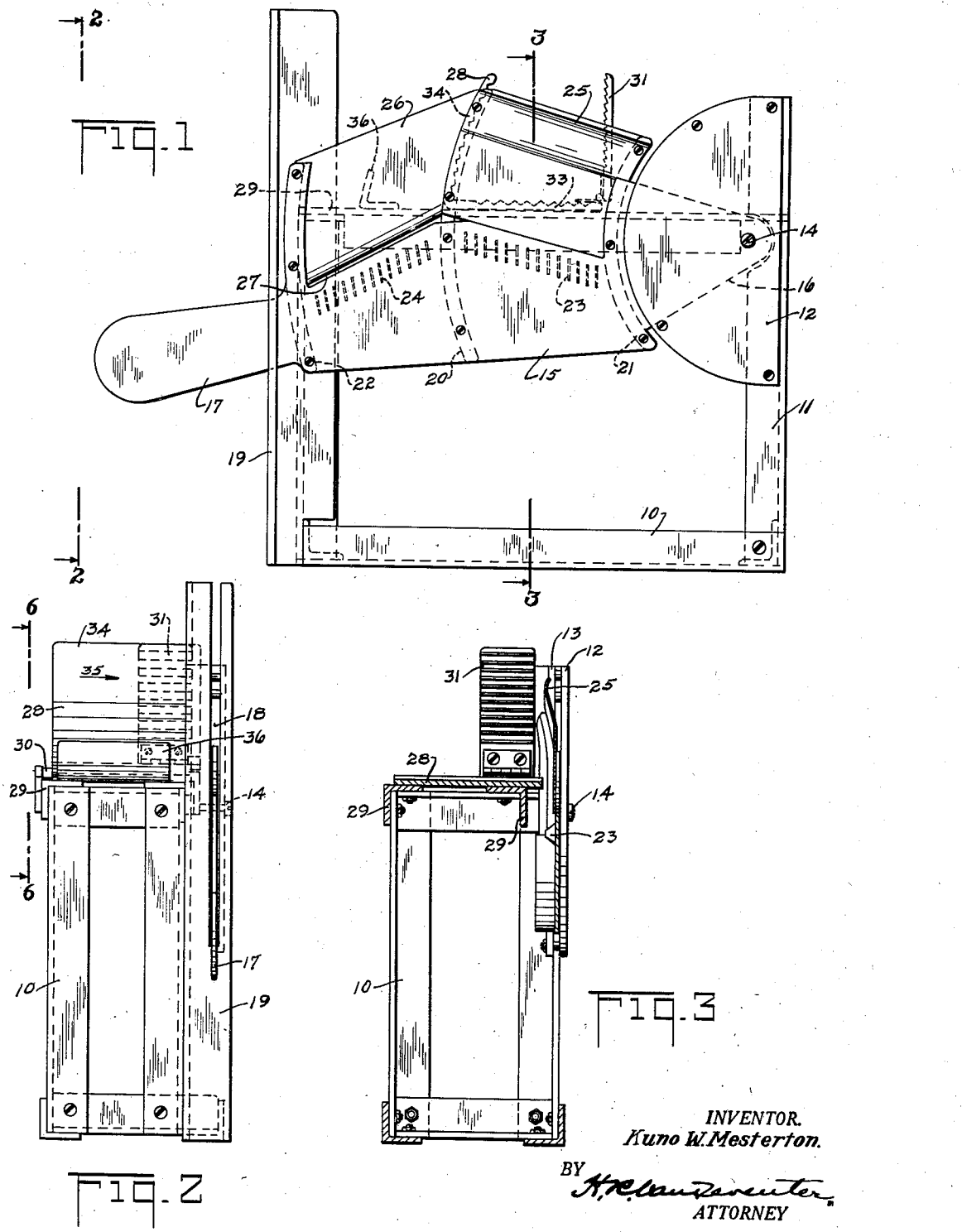
INVENTOR.
Kuno W. Mesterton.
BY
ATTORNEY April 19, 1938.  K. W. MESTERTON  2,114,428
VEGETABLE CUTTER AND SLICER
Filed Sept. 17, 1936   2 Sheets-Sheet 2
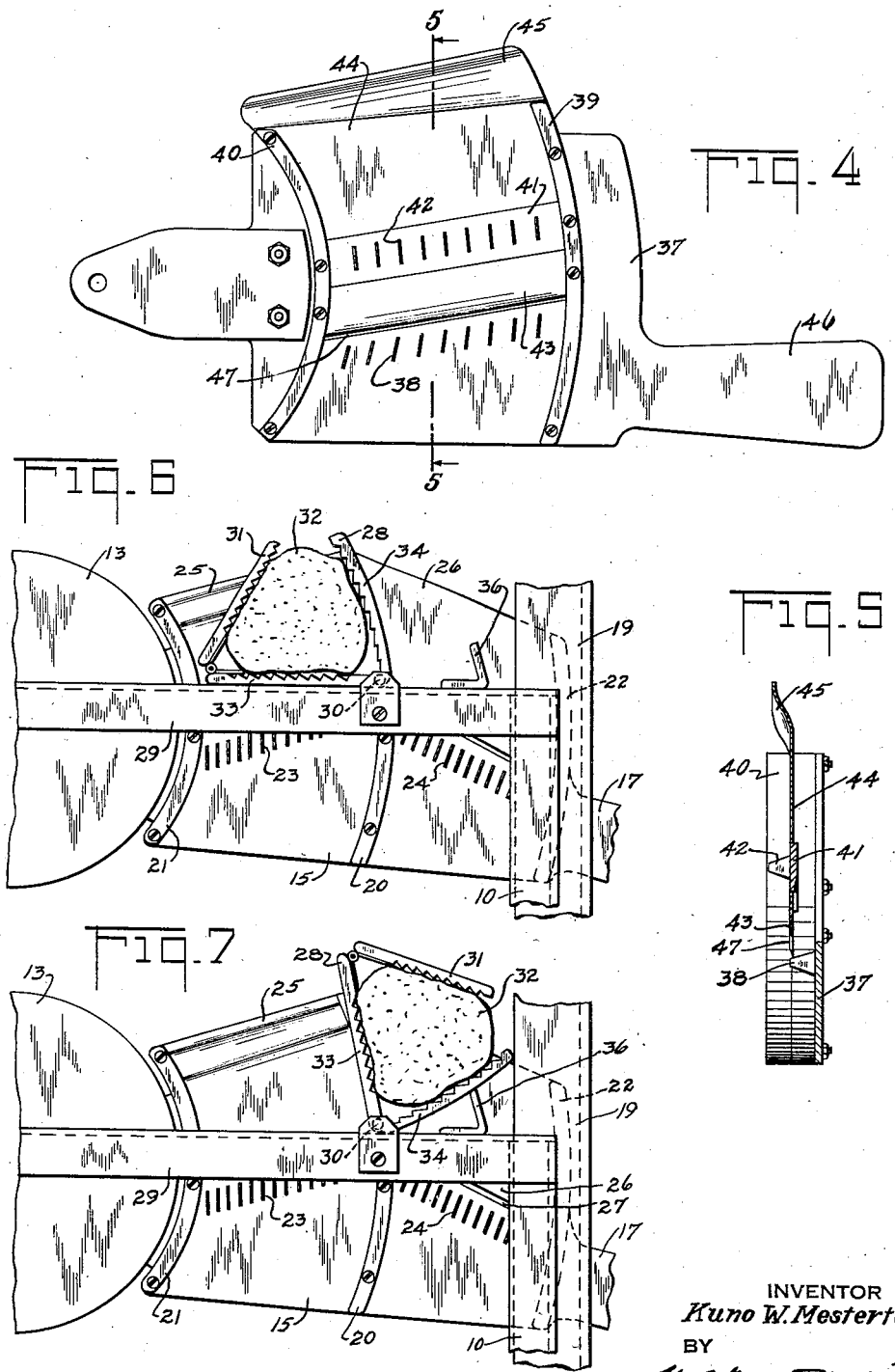
INVENTOR
*Kuno W. Mesterton.*
BY
ATTORNEY Patented Apr. 19, 1938

2,114,428

UNITED STATES PATENT OFFICE 2,114,428

VEGETABLE CUTTER AND SLICER

Kuno W. Mesterton, Brooklyn, N. Y.

Application September 17, 1936, Serial No. 101,257

9 Claims. (Cl. 146—78)

This invention relates to improvements in vegetable cutters and slicers and has for an object the production of a device of the character described of simple construction and adapted for home, restaurant and hotel use.

More specifically, the invention relates to a device for producing cubed vegetables, and another object is to produce a device for making "potato dice", although it will be understood that the device is not limited to the production of dice, but may be used to make "shoestring" potatoes or "Saratoga chips" or the like as will more fully hereinafter appear.

A further object is to produce a vegetable cutter having a knife carrier which is mounted to swing in a vertical arcuate path and which is prevented from having any lateral motion by means mounted on the main frame of the cutter.

Still another object is to provide a vegetable cutter having a movable vegetable holder on the main frame thereof adapted to move a vegetable to two positions in respect to the knives in the device.

The invention consists substantially in the construction, combination, location and relative arrangement of parts, all as will be more fully hereinafter set forth and as shown by the accompanying drawings and fully contained in the appended claims.

For the sake of illustration, the device will be described in a preferred embodiment as more fully shown in the accompanying drawings, in which:

Figure 1 is a side view of a vegetable cutter arranged for making potato dice or the like;

Figure 2 is an end view of the device on the line 2—2, Figure 1;

Figure 3 is a sectional view of the device on the line 3—3, Figure 1;

Figure 4 is a side view of an alternate form of knife carrier that may be used in the device shown in Figure 1;

Figure 5 is a sectional view of the carrier shown in Figure 4 on the line 5—5 thereof;

Figure 6 is a view of the device shown in Figure 1, showing the vegetable holder thereon in one position; and Figure 7 is a view similar to Figure 6 with the vegetable holder moved to another position.

The device has a supporting frame, generally designated by the numeral 10, which may be constructed in any suitable manner, from castings, stampings or the like, or may be assembled from members secured together by spot welding, or by screws, as shown in the drawings.

The frame has an upright 11 having secured thereto a pair of parallel guide or guard plates 12, 13, Figure 3, which are spaced apart to receive an extended portion of the knife carrier to be presently described.

Supported in the plates 12, 13 is a shouldered screw 14 forming a supporting shaft or pivot for the knife carrier.

The knife carrier, generally denoted by the numeral 15, has an extended portion 16 adapted to fit between plates 12, 13 and apertured to receive the pivot screw 14. The carrier is also provided with a handle 17 which may be integral with the body of the carrier or which may be secured thereto in any suitable manner.

The carrier is positioned to swing in an arcuate vertical path by having the end 16 thereof positioned between the plates 12 and 13 and held therein by means of the screw 14, while the handle end 17, Figure 2, is positioned within a slit 18 in the upright 19 of the frame 10. This prevents lateral motion of the carrier when in use.

The body portion of the carrier 15 lying between the plate 12 and the upright 19, is substantially flat and is divided by a transverse rib 20. Ribs 21 and 22 are also provided at the ends of the carrier, as shown, and all said ribs are arcuate in form and extend laterally from the knife side of the carrier and serve to protect the knives if the carrier is removed from the machine and laid knife-side down on a flat surface.

Mounted upon the body portion of the carrier are slitting knives arranged in two groups indicated by the numerals 23 and 24, all said knives having their planes substantially vertical, as shown in Figure 1, and the groups of said knives being arranged at an angle, as shown.

The upper portion of the carrier body is displaced forwardly over one set of knives, as shown at 25, for a purpose to be presently described.

Rearwardly of the displaced portion of the carrier just described, is positioned the cutting knife 26. This knife is set sufficiently forward from the body portion of the carrier to leave a space 27 between the bottom or cutting edge of the cutting knife and the rear surface of the body of the carrier. The cutting knife 26 is displaced forward beyond the points of the slitting knives 24 so as to be on a line with, or partly outside of, said points which enables a slice to be cut off a vegetable, as presently described.

It will be seen that the knife 26 and the displaced portion 25 of the carrier 15, if said displaced portion is made in a separate part, are all secured and held in position on the carrier by the rib members 20, 21, 22 and that the carrier, in effect, is a movable member carrying the two groups of slitting knives 23, 24 and the cutting knife 26 and that the body of the carrier has a space therethrough which is shown at 27.

Referring to Figures 6 and 7, a vegetable holder 28 is pivoted on the upper member 29 of frame 10 to swing about an axis 30. This holder has a hinged side 31 adapted to be swung against a vegetable 32 to clamp said vegetable between the inner serrated surfaces of the holder, as shown. Said holder is therefore adapted to position said vegetable in front of either row 23 or 24 of the slotting knives and in front of the cutting knife 26.

It will be observed that the holder 28 has a bottom portion 33 adapted to lie flat on the upper member 29 of the frame and an upwardly extending vertical portion 34, which is arcuate in form, the curve of which corresponds substantially to the path of travel of the knife carrier 15.

In operation, a vegetable, such as a potato, for example, having a flat surface, is placed in the holder 28, with the flat surface opposed to the carrier 15 which is raised. The potato is pushed inwardly, bringing the flat surface of the same against the smooth opposed surface of the carrier 15 below the slotting knives 23. The handle 17 is then depressed and the knives 23 will slot the face of the vegetable opposed to them. As the knife carrier continues downward on this stroke, the inwardly displaced portion 25 of the carrier 15 pushes the vegetable outward and away from the knives.

The holder 28 is then rocked to the position shown in Figure 7, a suitable stop member 36 being provided to so position the holder that the slots to be cut in the vegetable by knives 24, as will presently be described, will be at right angles to the slots, which have already been cut by the knives 23.

The vegetable being in the position shown in Figure 7, it is now pressed inwardly in the direction of the arrow 35, Figure 2, after the handle 17 has been raised to the top of its stroke. This brings the already slotted end of the vegetable under the knives 24. The handle 17 is now depressed and knives 24 slot the vegetable. As the downward stroke of handle 17 continues, the edge of the cutting knife 26 engages the doubly slotted end of the vegetable and severs or slices off a suitable thickness of this end, which slice is formed of dice as it has been slotted in two directions. These dice fall apart and some of them may fall through the slit 27 in the carrier and down the back thereof. The slot 27 therefore prevents the dice from piling up on the knives 24.

This process can be continued until the vegetable is completely diced.

Figures 4 and 5 show an alternate form of construction for the knife carrier. Here a plate 37 has extending therefrom a set of slitting knives 38. The plate is partially cut away between the two arcuate ribs 39, 40. Within the cut-away portion is positioned a plate 41 carrying a set of slitting knives 42 and a cutting knife 43. Above the plate 41 is positioned a plate 44 which is displaced outward above the knives as shown at 45.

The operation of this form of knife carrier, which may be pivoted in the main frame the same as the carrier 15, Figure 1, is that with the holder 28 in the position shown in Figure 6 the vegetable is first pressed inwardly against the flat surface of the knife 43, which properly positions the vegetable to be slitted by the downward stroke of the handle 46 which carries the row of cutting knives 42 through the vegetable. As this downward stroke continues, the displaced portion 45 of plate 44 pushes the vegetable away from the path of travel of the knife carrier which permits the vegetable to be swung to the position shown in Figure 7.

The handle 46, meanwhile, having been raised, the vegetable is pushed inwardly until it encounters the flat surface of plate 37 below the slotting knives 38. As the handle continues its downward stroke, the vegetable will be slotted and will then encounter the lower edge of cutting knife 43 which cuts off the slitted portion of the vegetable, which slotted portion falls away in the form of dice. There is no tendency for the carrier to choke because if any dice pass underneath the edge of knife 43 they will fall through the free space 47 to the back of the carrier.

From the foregoing specification it will be obvious that this vegetable cutter employs a knife carrier carrying parts in two parallel planes with a plurality of slitting knives on each of said parts arranged in rows at an angle to the longitudinal center of the knife carrier and that a cutting knife may form the edge of one of said planes and is located between the rows of slitting knives and that the carrier is adapted to be moved in a vertical plane in an arcuate path. This arrangement provides a simple and efficient construction and one which may easily be taken apart for cleaning and in which there are no parts that require adjustment.

What is claimed is:

1. In a vegetable cutter, a supporting frame, a knife carrier pivotally mounted thereon comprising a plate having a handle projecting therefrom, a plurality of radially spaced slitting knives mounted on said plate in angular array relative to each other in two groups forming an angle with its apex near the middle of said plate, the extremities of said slitting knives terminating in a plane spaced apart from and parallel to said plate, a cutting knife on said carrier having its cutting edge positioned in the plane of the extremities of one set of said slitting knives, means forming an opening in said plate between said cutting knife and said last groups of slitting knives whereby sliced portions of a vegetable upon being cut by said cutting knife may fall to the rear of said plate and outside said frame, and a vegetable holder pivotally mounted on said frame adjacent to and having an axis transverse to said knife carrier, said holder being rockably mounted on its pivot to alternately feed the vegetable to said sets of knives.

2. A vegetable cutter comprising a frame, a knife carrier comprising a plate mounted to swing thereon, a pair of sets of radially spaced slitting knives secured thereto and projecting therefrom in planes parallel to the axis about which said carrier swings, a slicing knife positioned on said plate adjacent to one of said sets of slitting knives and operated in a plane parallel to said carrier, a vegetable holder rockably mounted on a pivot on said frame and also movable longitudinally on said pivot, said holder being adapted to hold a vegetable therein to be first slitted by one set of said slitting knives, a camming member on said carrier for forcing said vegetable in said holder away from said last set of slotting knives to permit said carrier to complete a swing, said holder being adapted to be rocked after said first slitting operation to present the slotted portion of said vegetable to the action of the second set of slotting knives, and a slicing knife on said carrier adapted to sever the slotted portion of said vegetable therefrom during the completion of the stroke of said carrier in which said second set of slotting knives operate.

3. A vegetable cutter comprising a supporting frame, a holder for holding and moving a vegetable to two different positions on said frame, a knife carrier pivotally secured to said frame and adapted to move in an arcuate path parallel to the face of a vegetable held in said holder, a row of parallel slitting knives mounted on said carrier at right angles to the surface thereof and extending toward said holder adapted to slit the vegetable when said holder is in one position, a second row of slitting knives also mounted on said carrier at right angles to the surface thereof and adapted to slit the vegetable when said holder is in another position, the extremities of all said slitting knives terminating in a plane spaced apart from and substantially parallel to the surface of said holder and a slicing knife on said holder spaced apart from said second row of slitting knives and lying in substantially the same plane as the extremities of said slitting knives and adapted, by a combined movement of same after said last slitting operation, to cut the slit portion from said vegetable while the unslit portion thereof remains stationary in said holder.

4. A vegetable cutter comprising a supporting frame, a pivot member in said frame, a knife carrier mounted on said pivot to operate in a given plane, a pair of sets of radially spaced slitting knives on said carrier and projecting therefrom in planes parallel to the axis of said pivot, a slicing knife positioned on said carrier adjacent to one of said sets of slitting knives and operated in a plane parallel to said carrier, and a vegetable holder pivotally mounted adjacent to and having an axis transverse to said knife carrier, said holder being rockably mounted on its pivot to alternately feed the vegetable to said sets of knives.

5. A knife carrier for vegetable cutters including a substantially flat portion, a pair of sets of radially spaced slitting knives on said flat portion slightly spaced apart from each other and projecting therefrom in a plane parallel to each other and angular in respect to the surface of said flat portion, a slicing knife positioned on said carrier adjacent to one of said sets of slitting knives, means forming an opening between said slicing knife and its adjacent set of slitting knives, and a cam member formed of said flat portion in line with the other of said sets of slitting knives to overlie the cutting edges of the slitting knives in said last set and terminating in a plane parallel to said carrier, substantially in line with said cutting edges and adapted to engage a vegetable after the same has been slit by said cutting edges.

6. In a vegetable cutter having a frame, a knife carrier adapted to operate in a given plane, said knife carrier having one end adapted to be pivotally supported in said frame and the other end forming a handle, the portion of said carrier between said first end and said handle being comprised of a substantially flat portion, a pair of sets of radially spaced slitting knives on said flat portion of the carrier and projecting therefrom in planes parallel to the axis of the pivotal support, a slicing knife positioned on said carrier adjacent to one of said sets of slitting knives and operated in a plane parallel to said carrier, said flat portion in line with the other of said sets of slitting knives being displaced to overlie the cutting edges of the slitting knives in said last set and terminating in a plane parallel to said carrier and practically in line with said cutting edges thereby forming a cam, and a vegetable holder pivotally mounted adjacent to and having an axis transverse to said knife carrier, said holder being rockably mounted on its pivot to alternately feed the vegetable to said sets of knives and being adapted to be moved longitudinally on its axis when said cam engages the vegetable.

7. A knife carrier for vegetable cutters including a flat plate adapted to operate in a given plane and having one end thereof forming a handle, a pair of sets of radially spaced slitting knives on a flat portion of said plate in groups slightly spaced apart from each other and projecting from said plate in planes parallel to each other and at right angles to the surface of said plate, the cutting edges of said slitting knives terminating in a plane spaced apart from and parallel to said surface, a cam member formed integral with said plate and deformed to terminate substantially in line with the plane of said cutting edges, a slicing knife supported on said plate in spaced relation to the other of said sets of slitting knives and positioned in line with the plane of said cutting edges, and means forming an opening in the space between said slicing knife and said second set of slitting knives through which cut vegetables may pass.

8. In a knife carrier for vegetable cutters according to claim 7, the provision of a pivotal member in the end of said plate opposite that forming said handle, and a plurality of arcuate ribs defining the cutting arms of said knives.

9. A vegetable cutter according to claim 1 in which said vegetable holder is also movable longitudinally on its pivot, and in which a portion of said carrier in line with the other set of slitting knives is displaced in the direction of the extremities of said knives to form a cam adapted to engage the vegetable and move said carrier longitudinally on its axis and beyond the range of said knives.

KUNO W. MESTERTON.